Patented Apr. 13, 1926.

1,581,001

UNITED STATES PATENT OFFICE.

HENRY W. DAHLBERG, OF DENVER, COLORADO, ASSIGNOR TO THE GREAT WESTERN SUGAR COMPANY, OF DENVER, COLORADO, A CORPORATION OF NEW JERSEY.

PROCESS OF MANUFACTURING ALCOHOL BY FERMENTATION.

No Drawing.  Application filed March 21, 1925. Serial No. 17,441.

*To all whom it may concern:*

Be it known that I, HENRY W. DAHLBERG, a citizen of the United States, residing at Denver, in the county of Denver and State of Colorado, have invented new and useful Improvements in Processes of Manufacturing Alcohol by Fermentation, of which the following is a specification.

This invention relates to the production of alcohol by fermentation which is carried on vigorously and rapidly by stimulating and feeding the yeast of a fermenting mash with certain specific materials containing organic nitrogen.

It is known in fermentation practice that the more vigorous the fermentation, the less other undesirable side fermentations take place, such as the formation of acetic acid, and thereby the yield of alcohol is increased. In accordance with the present invention the increased yield of alcohol is particularly noticeable when the fermentation is carried on in a mash to which has been added certain materials containing organic nitrogen compounds, particularly beet waste water produced as result of the desugaring of beet molasses. The action of these materials is not fully understood, but it may be due to the presence of "bios", a substance of a complex nature which is thought to have a stimulating effect on the growth of yeast and accelerate its action.

The present invention is directed to the improvement of the mash material and conditions of fermentation to effect an increased yield of alcohol. This improvement is brought about by the addition to the mash of a particular material which contains organic nitrogenous matter and mineral salts. The particular material is any extract of sugar beets which contains a major portion of the nitrogenous matter originally present in the beet and substantially no commercially recoverable sugar. Such an extract may be prepared in various ways, but the preferred material is the waste water resulting from the desugarizing of beet molasses when an alkaline earth metal compound is used to precipitate an alkaline earth metal saccharate from molasses. The waste water is the liquid remaining after molasses has been treated to obtain its last available sugar content as a saccharate, such as calcium, strontium, or barium saccharate. This waste water run from the filters is high in nitrogen content, and otherwise a waste material. An example of such a waste water is that known as "Steffen waste water", produced during the process of desugarizing beet molasses by means of powdered lime. The waste water may be used in conjunction with any yeast mash containing saccharine material, such as molasses or grain in any form. These materials are deficient in organic nitrogen, particularly in the form of "amino nitrogen" such as is found present in waste water.

The following procedure may be used for treating a mash made from sugar cane molasses or syrups of sugar cane material to produce ethyl alcohol. First, beet molasses is desugarized by the addition of powdered lime added to a cold dilute molasses solution. The major portion of the sugar is precipitated as a calcium saccharate, and the remainder of the material comprises the waste water previously described. The saccharate and the waste water are separated, the saccharate being further treated to obtain sugar, the waste water being used in the remainder of the present process in accordance with the following description. This material occupies relatively small bulk as compared to the original molasses from which it is obtained. A mash of cane molasses is prepared in the regular way by diluting it with water. The beet extract or waste water, containing about 50% dry substance, and 2.5% to 3.0% total nitrogen, is then added to the extent of 5% of the weight of molasses. The percentage of extract added may vary from 1% to 10% of the molasses in the mash, by weight, depending on its concentration and the conditions desired for the fermentation. The mash is then slightly acidified with an acid, such as sulphuric acid. It is preferable to use the degree of acidity shown by a slight yellow coloration with the indicator, brom-cresol purple. The mash is then brought to the desired temperature, 25° C. to 30° C., yeast is added and the mash is allowed to ferment. The rate of fermentation is indicated by the alcohol content of the mash at various intervals and by the evolution of carbon dioxide. When the maximum yield of alcohol is reached, or at the end of about seventy-two hours, it may be recovered in the usual way, such as by distillation.

The above description applies particularly to the production of ethyl alcohol, but the use of the beet extractive matter is equally applicable for the production of other alcohols, such as butyl alcohol, the proportions of materials used being properly adjusted.

The following table shows the results obtained by the procedure used in this invention as compared to treatments in which: 1st: no "waste water" is used; or, 2nd: where soluble nitrogenous matter is added.

|  | Alcohol produced after 48 hours. | Per cent of theoretical yield after 72 hours. |
| --- | --- | --- |
| No. 1. Mash, without "waste water" extract. (Old process.) | 66.4 | 81.0 |
| No. 2. Mash, with soluble nitrogenous matter added, but no "waste water." (Old process.) | 70.5 | 83.6 |
| No. 3. Mash, with 5% extract added. (The present invention.) | 81.4 | 89.8 |

No. 3 shows a large advantageous yield as result of this process.

In all of the three cases cited the same molasses was used, and exactly the same quantity of sugar was present. As well as being proven by the above figures, the more rapid fermentation is evidenced by the greater evolution of carbon dioxide in the mash containing beet extractive matter, than in either of the other two mashes.

It is thought that the action of the materials used cannot be due only to the nitrogen added as a yeast food, since nitrogen added in soluble form and in larger amounts does not have the same stimulating effect. It is believed therefore that the materials used, being of vegetable origin, contain a "bios" which greatly stimulates the yeast.

I claim:

1. The process of manufacturing alcohol, which process consists in fermenting a mash by yeast and beet extractive matter containing an organic nitrogen compound and including substantially all of the beet extractive matter of beet molasses but substantially no commercially recoverable sugar, and recovering the alcohol formed.

2. The process of manufacturing alcohol, which process consists in preparing a yeast fermentable mash, adding to said mash waste water produced in the desugarizing of beet sugar containing liquids when an alkaline earth metal compound is used to precipitate an alkaline earth metal saccharate from beet molasses and leave waste water, adding yeast to the resulting mixture and allowing it to ferment, thus producing alcohol, and then recovering the alcohol.

3. The process of manufacturing alcohol, which process consists in preparing a yeast fermentable mash of molasses diluted with water, adding to said mash beet extractive matter containing an organic nitrogen compound and including substantially all of the beet extractive matter of beet molasses but substantially no commercially recoverable sugar, adding an acid to slightly acidify the resulting mixture, adding yeast to the mixture and allowing it to ferment to produce alcohol, and then recovering the alcohol.

4. In the manufacture of alcohol, the process of treating a yeast fermentable mash for the reception of yeast, which mash contains yeast assimilable nitrogenous material, by increasing the proportion of such nitrogenous material by adding to the mash waste water produced in the desugarizing of beet sugar containing liquids when an alkaline earth metal compound is used to precipitate an alkaline earth metal saccharate from beet molasses and leave waste water.

5. The process of manufacturing alcohol, which process consists in preparing a yeast fermentable mash of molasses diluted with water, adding to said mash waste water produced in the desugarizing of beet sugar containing liquids when an alkaline earth metal compound is used to precipitate an alkaline earth metal saccharate and leave waste water, adding an acid to slightly acidify the resulting mixture, adding yeast to the mixture and allowing it to ferment to produce alcohol, and then recovering the alcohol.

6. The process of manufacturing alcohol, which process consists in preparing a yeast fermentable mash of molasses diluted with water, adding to said mash, in the proportion of 5% by weight of molasses in the mash, waste water produced in the desugarizing of beet sugar containing liquids and containing about 50% dry substance and 2.5% to 3.0% total nitrogen and produced when an alkaline earth metal compound is used to precipitate an alkaline earth metal saccharate from such liquids leaving waste water, slightly acidifying the resulting mixture with surphuric acid, adding yeast to the mixture and allowing it to ferment to produce alcohol, and then recovering the alcohol.

7. The process of manufacturing alcohol, which process consists in preparing a yeast fermentable mash of molasses diluted with water, adding to said mash, in the proportion of 1% to 10% by weight of molasses in the mash, waste water produced in the desugarizing of beet sugar containing liquids when an alkaline earth metal compound is used to precipitate an alkaline earth metal saccharate from such liquids and leave waste water, slightly acidifying the resulting mixture with sulphuric acid, adding yeast to the mixture and allowing it to ferment to produce alcohol, and then recovering the alcohol.

In testimony whereof I affix my signature.

HENRY W. DAHLBERG.